United States Patent
Nagano

[15] 3,657,624
[45] Apr. 18, 1972

[54] SPEED CONTROL MECHANISM FOR A D.C. ELECTRIC MOTOR

[72] Inventor: Masahiko Nagano, Tokyo, Japan
[73] Assignee: Akai Electric Co., Ltd., Tokyo, Japan
[22] Filed: Sept. 21, 1970
[21] Appl. No.: 73,816

[30] Foreign Application Priority Data
Sept. 19, 1969 Japan..................44/74428

[52] U.S. Cl.............................318/341, 318/327
[51] Int. Cl.................................H02p 5/16
[58] Field of Search..................318/341, 326, 327

[56] References Cited
UNITED STATES PATENTS
3,409,814 11/1968 Azuma..................318/341
3,486,100 12/1969 James..................318/341

Primary Examiner—Bernard A. Gilheany
Assistant Examiner—Thomas Langer
Attorney—Sughrue, Rothwell, Mion, Zinn & Macpeak

[57] ABSTRACT

The speed controller includes a first pulse generator which operates in response to a motor revolution pickup head to produce a sawtooth pulse with the pulse interval being proportional to the speed of the motor and a second pulse generator for producing a series of pulses having a constant time lag relative to a certain preceding one of said sawtooth pulses. The combined pulses produce a control signal pulse series for control of the motor current.

5 Claims, 4 Drawing Figures 3,657,624

SPEED CONTROL MECHANISM FOR A D.C. ELECTRIC MOTOR

This invention relates to a speed control mechanism for D.C. electric motor.

A representative prior art electronic speed control for a D.C. motor using a pickup head generates a large variable number of pulses per revolution of the motor depending upon the speed thereof. These speed-responsive pulses are processed electronically so as to obtain a control signal which is used for the control of the drive current for the motor. However, the overall construction of the control is highly complicated and in addition, it is highly difficult to adjust the reference speed of the motor to a modified one for satisfying occasionally demanding conditions in the practical use of the motor.

The main object of the invention is to provide a control of the above kind, capable of providing an easy and simple means for occasional modification of the reference motor speed.

The object of the present invention is to provide a speed control mechanism of the above kind, capable of performing the desired speed control in an accurate way with a highly simplified structure.

This and other objects of the invention will appear more fully when read the following detailed description by reference to the accompanying drawings wherein substantially a preferred embodiment is shown only by way of example.

IN THE DRAWINGS

Figure 1:
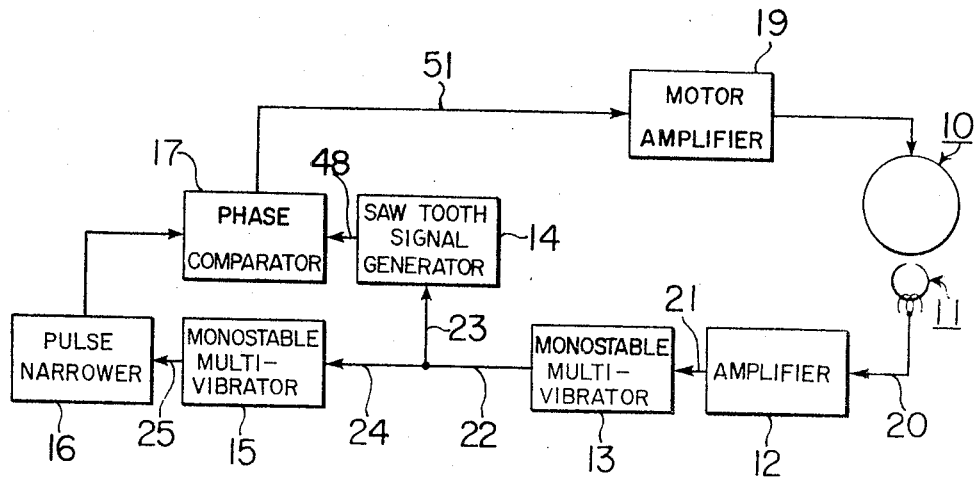
FIG. 1 is a schematic wiring block diagram of a representative embodiment of the speed control mechanism according to this invention.

Referring now to FIG. 1, the reference numeral 10 denotes a D.C. electric motor shown only in a highly simplified way by a small circle. The numeral 11 represents a magnetic pickup head of the conventional design and positioned in close proximity to or on the rotor of the motor 10 per se, as will be described more fully hereinafter by reference to FIG. 4. For instance, the pickup head may be positioned on the motor housing, not shown, so as to pick up the rotor revolutions in the form of a series of voltage pulses. This pickup head 11 generates continuously the pulse series in function of the revolutional speed of the motor shaft, not shown in FIG. 1. As an example, it generates a pulse per a complete rotation of the motor, for instance, at a frequency of 30 c/s (see, FIG. 2 at A).

Figure 2:
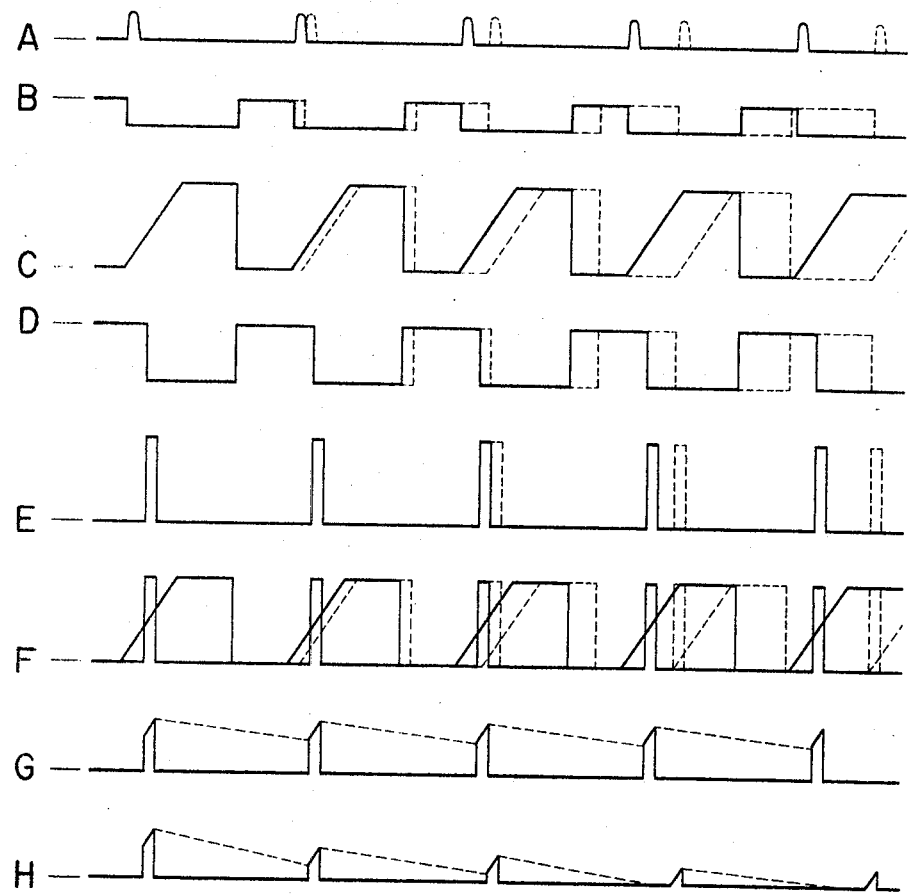
FIG. 2 is a chart showing several series of wave forms appearing in preferred several places in FIG. 1.

The pulse series is conveyed through a lead 20 to a conventional amplifier 12 which is shown in a highly simplified way by a block, thence through a further lead 21 to a first monostable multivibrator 13 of the conventional design, thereby the multivibrator being triggered each time by reception of a pulse from the amplifier, so as to deliver a rectangular pulse, as schematically shown in FIG. 2 at B. The first series of rectangular wave pulses is conveyed through leads 22 and 23 to a sawtooth signal generator 14 of the conventional design, and, at the same time, through leads 22 and 24 to a second monostable multivibrator 15 of the conventional design, wherein a second series of rectangular wave pulses is generated as shown in FIG. 2 at D, while the generated sawtooth wave pulses in the generator 14 are shown in FIG. 2 at C. As seen, the second rectangular wave pulse series D is substantially in phase relationship to the fist one B when seen only in their mutual timing relation only with the absolute values, however, being normally different from each other. The leading or lowering edge of each of the second pulse series D is positioned substantially at the middle of the rising slope of each of the sawtooth pulses C.

The signal output from the second multivibrator 15 is fed through a lead 25 to a pulse narrower 16 of the conventional design wherein a substantially narrowed third rectangular pulse series E is generated, each of these pulses being positioned, when seen in its timing, substantially at the middle of the rising slope of a corresponding one of the signal series C, as may be easily seen by comparison of the former with the latter. This mutual phase relationship is shown in FIG. 2 at F.

Figure 3:
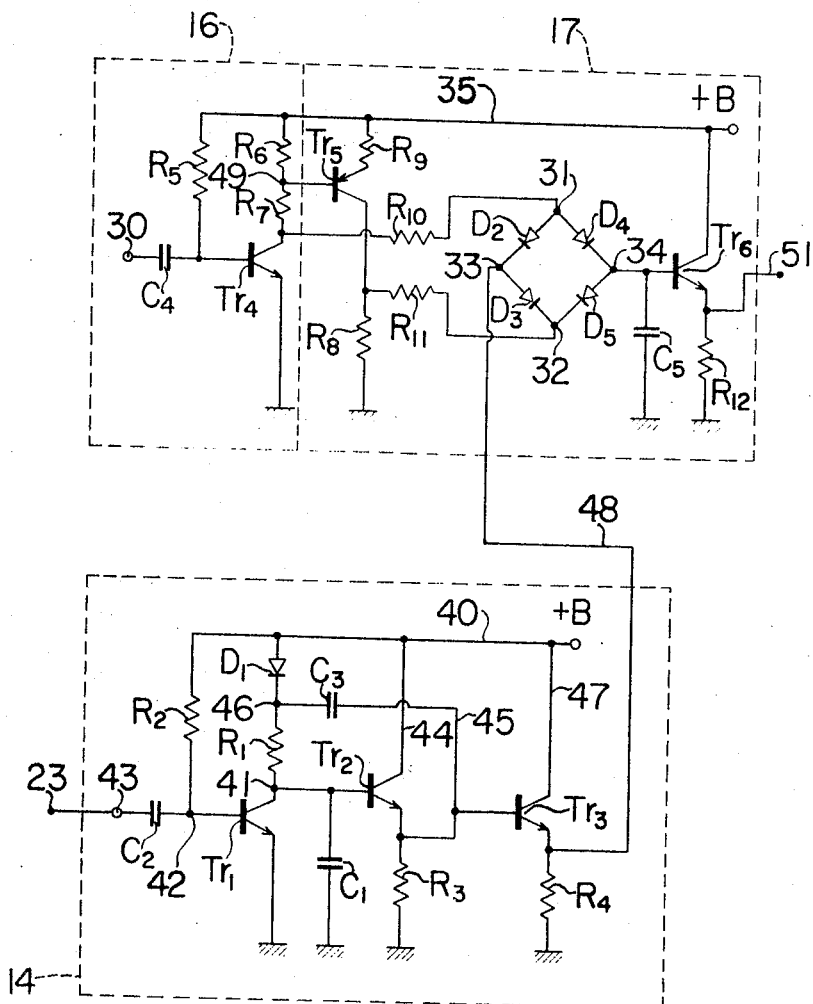
FIG. 3 is a detailed wiring diagram showing several preferred sections employed in the arrangement shown in FIG. 1.

Sawtooth wave signal generator 14 constitutes, as shown in FIG. 3, a kind of bootstrap circuit comprising transistors $Tr_1$ and $Tr_2$ and an emitter follower $Tr_3$.

A series combination of diode $D_1$, resistor $R_1$ and condenser $C_1$ is connected between a positive conductor 40 leading from the positive side +B of a battery, not shown, and the earth, a junction 41 positioned between resistor $R_1$ and condenser $C_1$ being connected to the collector of transistor $Tr_1$ and the base of transistor $Tr_2$, respectively. The emitter of transistor $Tr_1$ is connected to the ground, while the base of the latter is connected through a junction 42 and bias resistor $R_2$ to the positive conductor 40. Junction 42 is connected through condenser $C_2$ and terminal 43 with the lead 23.

Transistor $Tr_2$ is connected through its collector and lead 44 to the positive conductor 40, while the emitter of the transistor is connected through emitter resistor $R_3$ to the ground, thereby constituting an emitter follower. The output of this emitter follower is connected through lead 45 and feedback capacitor $C_3$ to a junction 46 which is provided between diode $D_1$ and resistor $R_1$.

Emitter follower $Tr_3$ is connected by its collector and a lead 47 to the positive conductor 40, while the emitter is connected through resistor $R_4$ to the ground and the base is connected to the emitter of transistor $Tr_2$.

Transistor $Tr_1$ is normally conductive, while transistor $Tr_2$ is normally in its cut-off state.

Condenser $C_1$ is normally in its discharged state through the collector-emitter passage of transistor $Tr_1$, thus the voltage across said condenser being normally zero.

With application of a negative-going pulse, as shown in FIG. 2 at B, from the first monostable multivibrator 13 through lead 23 and terminal 43, transistor $Tr_1$ will turn to its cut-off state, while transistor $Tr_2$ will become conductive. Then, condenser $C_1$ will start to accumulate a charge therein through diode $D_1$ and resistor $R_1$ and towards the level of the battery voltage +B.

The voltage appearing across the condenser $C_1$ is conveyed to emitter follower amplifier $Tr_2$ to be amplified, thence fed back through capacitor $C_3$ to junction 46. Since the voltage gain of emitter follower $Tr_2$ has been selected substantially unit, the voltage across the resistor $R_1$ is substantially constant. Therefore, current flowing through the resistor $R_1$ or more specifically the charging current for condenser $C_1$ will be maintained substantially at a constant value. Therefore, at this stage, the voltage across condenser $C_1$ will become increased substantially linearly towards the battery voltage +B.

With the pulse applied to input terminal 43 terminated to zero, transistors $Tr_1$ and $Tr_2'$ return to their respective normal state, thus the former becoming conductive and the latter turning to non-conductive. Then, the charge of condenser $C_1$ will be discharged through the collector-emitter passage of transistor $Tr_1$, thereby the voltage across the condenser reducing finally to zero.

The output voltage from transistor $Tr_2$ in the form of a series of sawtooth wave voltages as illustrated in FIG. 2 at C, is applied through the emitter follower $Tr_3$ through lead 48 to phase comparator 17.

Pulse narrower circuit 16 comprises a differentiator including a resistor $R_5$ and a capacitor $C_4$, and a transistor $Tr_4$. The collector of transistor $Tr_4$ is connected through load resistor $R_6$ and $R_7$ to a positive lead 35 impressed with battery voltage +B.

When the output signal (FIG. 2 at D) is conveyed from the second monostable multivibrator 15 through lead 25 to input terminal 30, the signal is subjected to a differentiation at the differentiator, and then amplified at transistor $Tr_4$, thus providing a series of corresponding, but substantially narrowed pulse signals as shown in FIG. 2 at E.

As was referred to, each of these pulses E is positioned, when seen in their relative timing, at the middle point of the risingly sloped portion of each of the corresponding sawtooth signal pulses C. The duration period of each of these narrowed pulses E is determined by the time constant provided by resistor $R_5$ and capacitor $R_4$.

Phase comparator circuit 17 comprises transistors $Tr_5$ and $Tr_6$ and diodes $D_2$, $D_3$, $D_4$ and $D_5$, constituting a bridge circuit as shown in FIG. 3.

The base of transistor $Tr_5$ is connected to a junction 49 positioned between resistors $R_6$ and $R_7$, while the collector of the transistor is connected through load regsitor $R_8$ to the earth and its emitter is connected through regsitor $R_9$ to the positive conductor 35. As may be supposed, transistor $Tr_5$ will serve to perform a phase inversion of the input signal pulses delivered from the phase narrower 16.

The bridge circuit mentioned above constitutes a parallel connection of a series combination of diodes $D_2$ and $D_3$ directing in the same direction with a further series combination of diodes $D_4$ and $D_5$ directing in the same direction to each other.

The junction 31 positioned between diodes $D_2$ and $D_4$ is connected to the collector os pulse narrower transistor $Tr_4$ through a resistor $R_{10}$, while a further junction 32 is connected through resistor $R_{11}$ to a collector of transistor $Tr_5$. Junction 31 and 32 are adapted to receive the output pulse series E from the pulse narrower circuit 16, and the phase inverted pulse series of those at E, having, however, a same amplitude as the latter, respectively. The junction 33 positioned between diodes $D_2$ and $D_3$ is adapted to receive the sawtooth wave signal C from the generator 14 through a conductor 48.

Junction 34 positioned between diodes $D_4$ and $D_5$ is grounded through capacitor $C_5$ and at the same time connected to the base of emitter follower $Tr_6$.

The collector of this transistor $Tr_6$ is connected to the positive conductor 35, while the emitter is connected through load resistor $R_{12}$ to the ground.

When the junctions 31 and 32 are fed with two pulse series having equal amplitude and opposite phases from the collectors of transistors $Tr_4$ and $Tr_5$, and the junction 33 is fed with a sawtooth pulse series C from the generator 14, a specific pulse series as shown at G of FIG. 2 will appear at the remaining junction 34, the top end of each of these pulses terminating by the crossing with the risingly increasing edge of the corresponding sawtooth pulses as seen from a comparison with the representation at F.

This output signal is subjected to a smoothening operation and thus, a D.C. signal shown by way of example in FIG. 2 at G appearing at the emitter of emitter follower $Tr_6$. This output signal is conveyed through lead 51 to a motor amplifier 19 so as to be amplified and phase-inverted. The output from the motor amplifier is fed to the motor 10 for driving thereof. When the motor speed should drop from a predetermined level, the pulse series A will correspondingly be retarded as shown by the dotted pulses. Similar delays will appear at B and E in FIG. 2 shown by respective dotted lines. In the rectangular pulse series D, the lag will amount substantially to a period. The position of each of the narrowed pulse series E at the center of each corresponding one of the increasingly inclined edges of the sawtooth pulse series will subjected to substantial modification, thereby the narrowed pulses being submerged below said inclined edges as shown at F in FIG. 2.

The amplitudes of the cut-out narrowed pulses will become gradually smaller as at H and the voltage of the output current delivered from the motor amplifier 19 to the motor will become correspondingly elevated so that the motor is controlled in the speed increasing direction, to its original value prior to the drop and vice versa.

Figure 4:
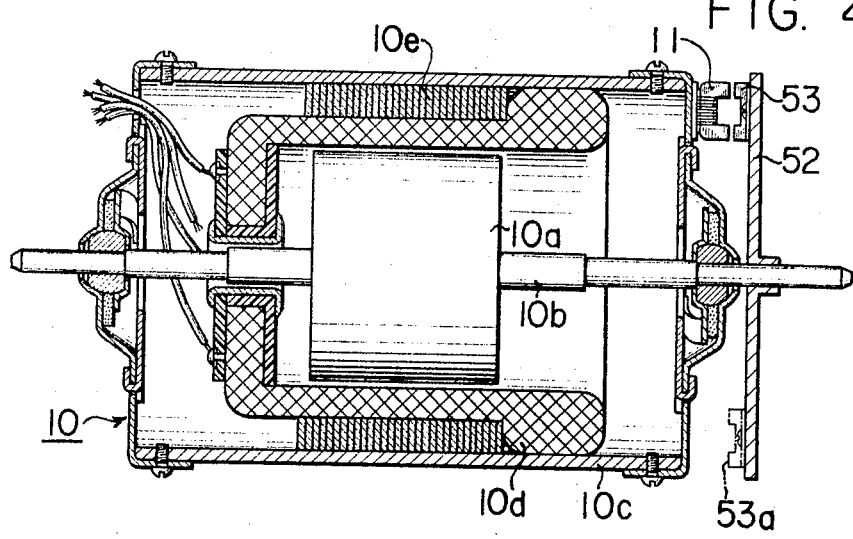
FIG. 4 is a longitudinal sectional view of a D.C. motor fitted with a pulse signal generator capable of delivering a series of signal pulses responsive to the rotational speed of the rotor of the motor.

A preferred arrangement of the pickup head 11 mounted on the motor 10 to be speed-controlled and adapted for the generation of a series of pulses as at A in FIG. 2, responsive to the motor speed, is shown by way of example in FIG. 4.

The motor 10 comprises a stationary housing 10c which mounts a stator coil 10d and a stator assembly 10e and rotatably a shaft 10b fixedly mounting a rotor 10a in a conventional manner. The rotor shaft 10b carries rigidly a disc 52 made of a non-magnetic material such as brass, a magnetic piece 53, preferably in the form of an inwardly projecting plate, being mounted fixedly on said disc at its peripheral area as shown. The pickup head 11 is fixedly mounted on one end of said housing 10c and positioned in a concentric registration with the head 11, so as to electromagnetically cooperate therewith. It will be seen that with this arrangement, a pulse will be generated for each revolution of the motor rotor 10a.

When necessary, a further magnetic piece as shown by chain-dotted lines at 53a may be provided on the disc 52 in a diametrally opposite relationship to the first piece 53. In this modified case, two pulses will be generated for each complete revolution of the rotor 10a. Naturally, the disc 52, magnetic piece or pieces 53; 53a and pickup head 11 may be arranged within the interior space of the motor housing 10c, in place of the outside arrangement shown, although not specifically shown.

For generating a pulse for two or more revolutions of the motor rotor 10a, the disc 52 may be driven through a suitable reduction gearing by the rotor shaft 10b. Naturally, the use of a single magnetic piece 53 will provide a simplest control arrangement for satisfying the desired accurate control service. The motor speed can be continuously modified by employing a variable time constant provided by the monostable multivibrator 13 or 15.

By stabilizing the pulse width in the output from these multivibrators, a highly stabilized motor speed control can be realized against possibly encountered various outside disturbing influences such as outside temperature variation, source voltage fluctuation and/or the like.

In the foregoing embodiment, a lag of substantially a complete period was employed for the pulses E relative to the sawtooth wave pulses C. It is also possible to impose substantially of a period on the sawtooth pulses relative to the pulse series E. These lags may be selected to two or more periods, when necessary.

What is claimed is:

1. A speed controller for a D.C. motor comprising a control circuit for controlling the drive current to said motor, said control circuit comprising:
   a. speed responsive means for producing an output indicative of the speed of said motor;
   b. sawtooth pulse generator means, coupled to said speed responsive means, for generating a series of sawtooth pulses having a predetermined pulse width and a repetition rate proportional to the output of said speed responsive means; and
   c. sampler means, coupled to said speed responsive means and said sawtooth pulse generator, for producing first pulses having a time lag relative to said sawtooth pulses and for comparing the phase of said sawtooth pulses and said first pulses thereby producing output pulses for controlling said motor.

2. The speed controller as set forth in claim 1 wherein said speed responsive means comprises:
   a. pickup means mounted on said motor for detecting the rational speed of said motor; and
   b. a first monostable multivibrator, connected to said pickup means, for producing a series of rectangular pulses which are indicative of the speed of said motor.

3. The speed controller as set forth in claim 2 further including means for varying the time constant of said first monostable multivibrator whereby the reference speed of said motor may be varied by varying the time constant of said first monostable multivibrator.

4. The speed controller as set forth in claim 2 wherein said sampler means comprises:
  a. a second monostable multivibrator coupled to said first monostable multivibrator;
  b. a pulse narrower connected to the output of said second monostable multivibrator; and
  c. a phase comparator having one input connected to said pulse narrower and a second input connected to said sawtooth pulse generator means, said phase comparator comparing said sawtooth pulses to the output of said pulse narrower.

5. A speed controller as set forth in claim 3 further comprising a D.C. amplifier coupled between said phase comparator and a source of said drive current for said motor.

* * * * *